United States Patent
Narcissi et al.

(10) Patent No.: US 6,899,018 B2
(45) Date of Patent: May 31, 2005

(54) ON-DEMAND COOKED PASTA VENDING MACHINE

(76) Inventors: Henry Narcissi, 26025 S. Golfview Dr., Frankfurt, IL (US) 60423; Larry Schwartz, 383 Birchwood Ave., Elk Grove Village, IL (US) 60005; Jack Novak, 8039 Highland Ave., Downers Grove, IL (US) 60516

( * ) Notice: Subject to any disclaimer, the term of this patent is extended or adjusted under 35 U.S.C. 154(b) by 0 days.

(21) Appl. No.: 10/337,660

(22) Filed: Jan. 7, 2003

(65) Prior Publication Data

US 2003/0167930 A1 Sep. 11, 2003

Related U.S. Application Data

(60) Provisional application No. 60/346,972, filed on Jan. 9, 2002.

(51) Int. Cl.[7] .......................... A47J 27/04; A47J 27/16; A47J 27/21; A47J 37/12; A23L 1/00
(52) U.S. Cl. .............................. 99/330; 99/331; 99/352; 99/357; 99/403; 99/407
(58) Field of Search ........................... 99/326–333, 339, 99/352–355, 357, 359–360, 403–417; 426/510–514, 557, 449, 523

(56) References Cited

U.S. PATENT DOCUMENTS

| | | | | |
|---|---|---|---|---|
| 4,869,160 A | * | 9/1989 | Pratolongo | 99/330 |
| 4,901,632 A | * | 2/1990 | Lori | 99/339 |
| 5,010,806 A | * | 4/1991 | Narcisi et al. | 99/357 |
| 5,033,364 A | * | 7/1991 | Narcisi et al. | 99/330 |
| 5,172,627 A | * | 12/1992 | Narcisi et al. | 99/330 |

* cited by examiner

*Primary Examiner*—Timothy F. Simone
(74) *Attorney, Agent, or Firm*—Orum & Roth (57) ABSTRACT

A method and apparatus for fast-cook pasta with automatic loading for variable sized portions. An amount of bulk product is isolated in a variable sized cavity. The contents of the cavity is discharged by gravity assisted mechanisms into a cooking chamber. The cooking chamber is pressurizable and uses preheated water. After the cooking period has ended, the cooking chamber is depressurized and the cooked pasta is transferred to a postcooker via a cooker exit valve. Heat energy present in vapor created by depressurization of the cooker is used to preheat the water.

14 Claims, 9 Drawing Sheets

ON-DEMAND COOKED PASTA VENDING MACHINE

This application claims the benefit of U.S. Provisional Patent Application No. 60/346,972 filed Jan. 9th 2002.

FIELD OF THE INVENTION

The present invention relates to fast cook pasta machines. Specifically, fast cook pasta machines with automatic pasta loading for variable sized portions.

BACKGROUND OF THE INVENTION

Conventional methods of pasta cooking involve the hydration and cooking of pasta via immersion in boiling water. Boiling water having a temperature of approximately 100° Celsius begins to flash, therefore in order to increase the cooking temperature beyond 100° Celsius pressure vessels are required. Pressure cooking at the resulting increased temperatures creates a dramatic decrease in the required cooking time. Previous fast pasta cooking apparatus have no means for automatic pasta loading of a variable sized portion and are relatively energy inefficient as they discharge the heat energy of the vapor released upon depressurization of the pressure cooking chamber. Also, the previous designs utilize hinged trap doors for cooked pasta discharge. These hinged doors added manufacturing complexity/expense and increased the machines manual cleaning requirements.

Previous attempts at supplying fresh pasta from an automatic or semi-automatic machine have suffered from the inability to properly dispense dry pasta portions, measured from a bulk supply, into the cooking chamber. Previous solutions include supplying a plurality of portion chambers each pre-loaded with the pre-determined pasta portions. These designs suffer from the drawback of having only a limited number of pre-determined pasta portions available prior to requiring reloading. Also, the size of the pre-determined portions is difficult to modify and or swiftly reload once the plurality of pre-determined portion chambers are in place (a smaller portion size would require manual metering).

SUMMARY OF THE INVENTION

The present invention solves problems with prior on-demand fast-cook pasta machinery by supplying a method and apparatus for sampling a pre-determined amount of bulk product from a hopper into a variable sized cavity which upon filling with the bulk product is isolated from the hopper and the contents discharged by a series of gravity assisted mechanisms into a cooking chamber. The cooking chamber is pressurizable via inlet and outlet ball valves and water inlet and vapor outlet valves. Preheated water is introduced into the cooking chamber from a boiler and the cooking pressure and temperature maintained for a specified period. When the cooking period has ended, the cooking chamber is depressurized and the cooked pasta transferred to a post cook chamber via the cooker exit valve. Heat energy present in vapor created by depressurization of the cooker which would otherwise be wasted is directed through a condenser through which the inlet water supply passes thereby transferring energy as a preheating of the inlet water supply. The post cook chamber holds the pasta in an unpressurized environment for further final cooking/hydration. A water rinse may be applied to remove starch that has transferred to the cooking water. A circular plug drain provides a simple and sanitary exit path for the cooked pasta.

Specific pasta configurations used in combination with the apparatus enable reduced cycle times (quick cooking) and problem free transport through the apparatus.

BRIEF DESCRIPTION OF THE FIGURES

One embodiment of the invention is disclosed by the figures as follows.

DETAILED DESCRIPTION

The cooking machine may be configured for institutional/commercial use or for example, in consumer self-service embodiments configured for coin or debit/charge operation. Upon entry of a pre-selected amount of money and/or credit and actuation of a start command the machine may be configured to initiate an automated fast pasta preparation cycle. In addition to preparing pasta ready to eat, the machine may be configured to prepare pasta to a pre-selected pre-cooked level—ready for quick re-heating/final preparation at a later time and or location.

Figure 1:
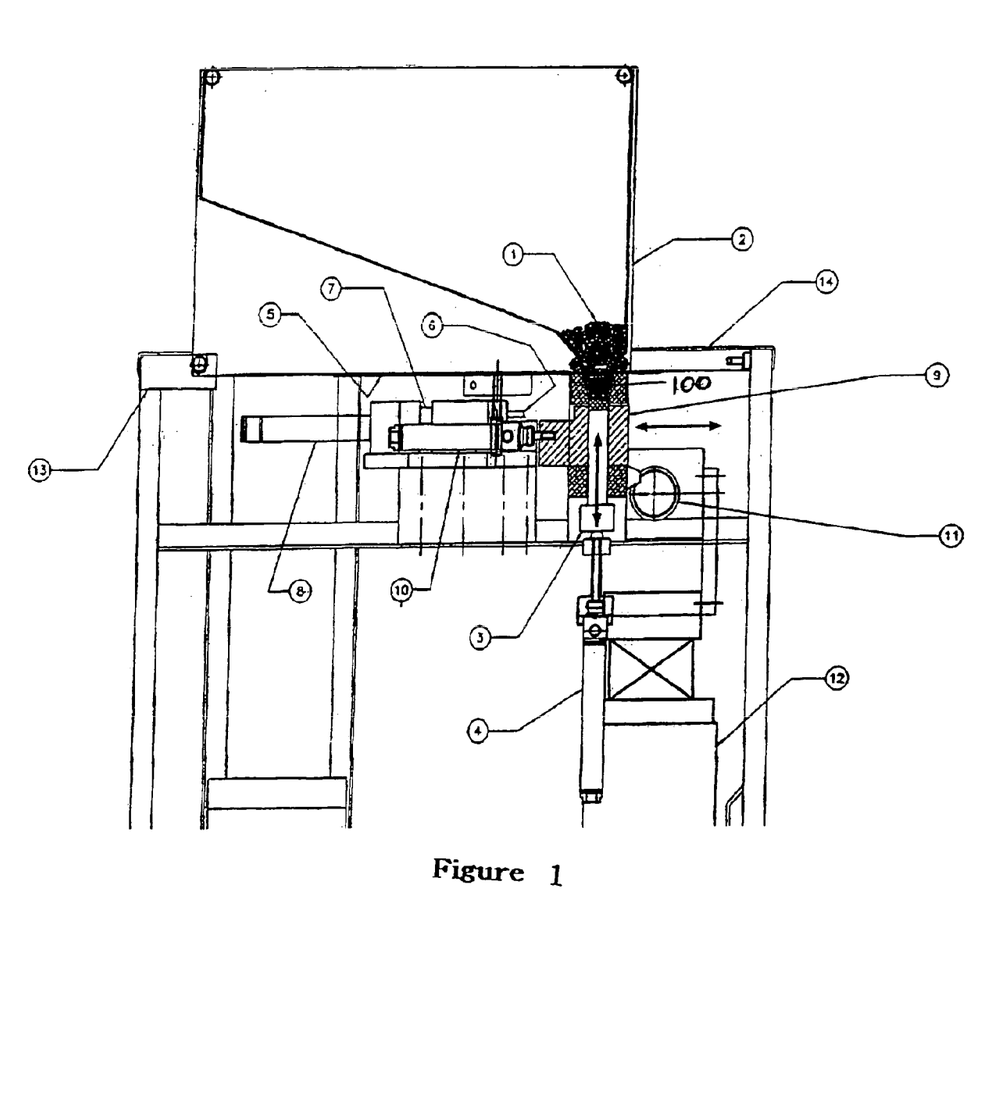
FIG. 1 is a partial front view of the bulk product supply module of the apparatus.
Figure 2:
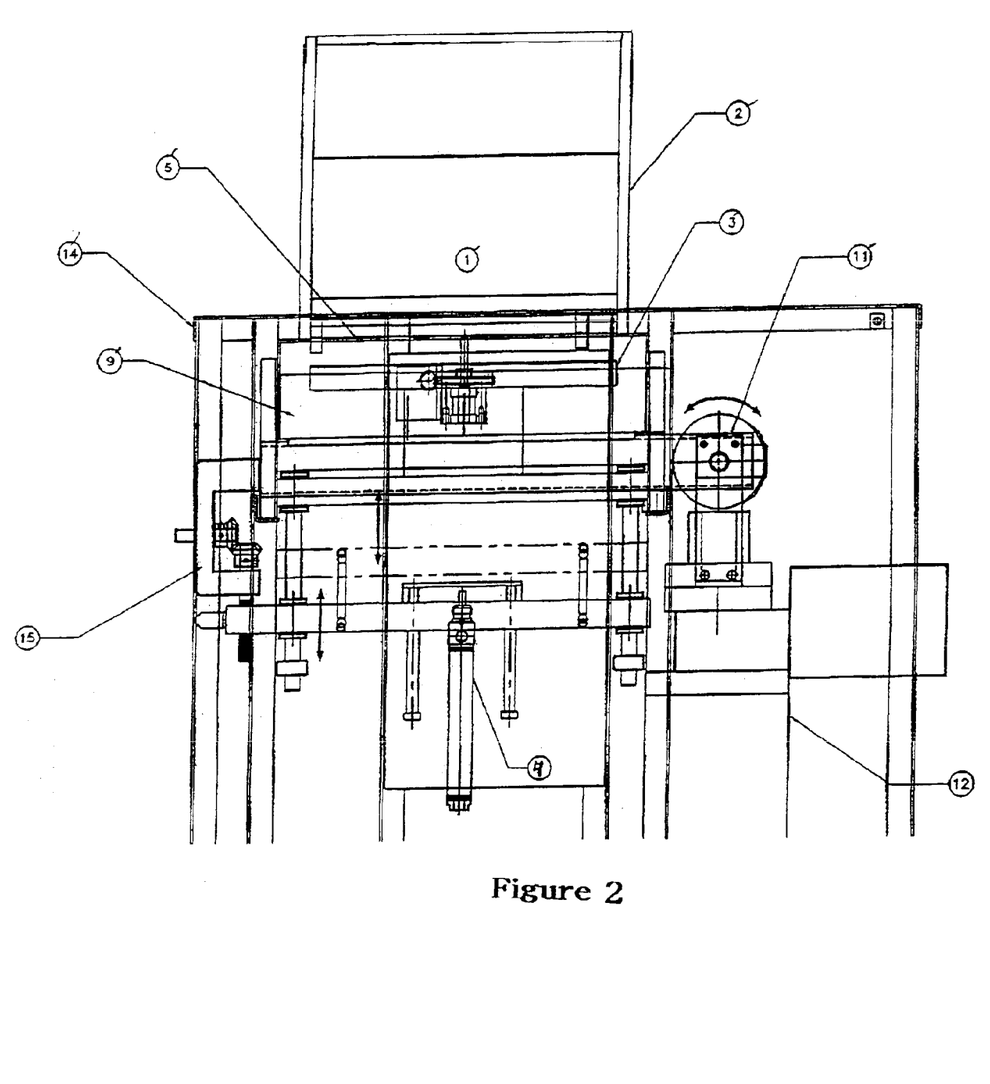
FIG. 2 is a partial side view of the bulk product supply module of the apparatus.
Figure 3:
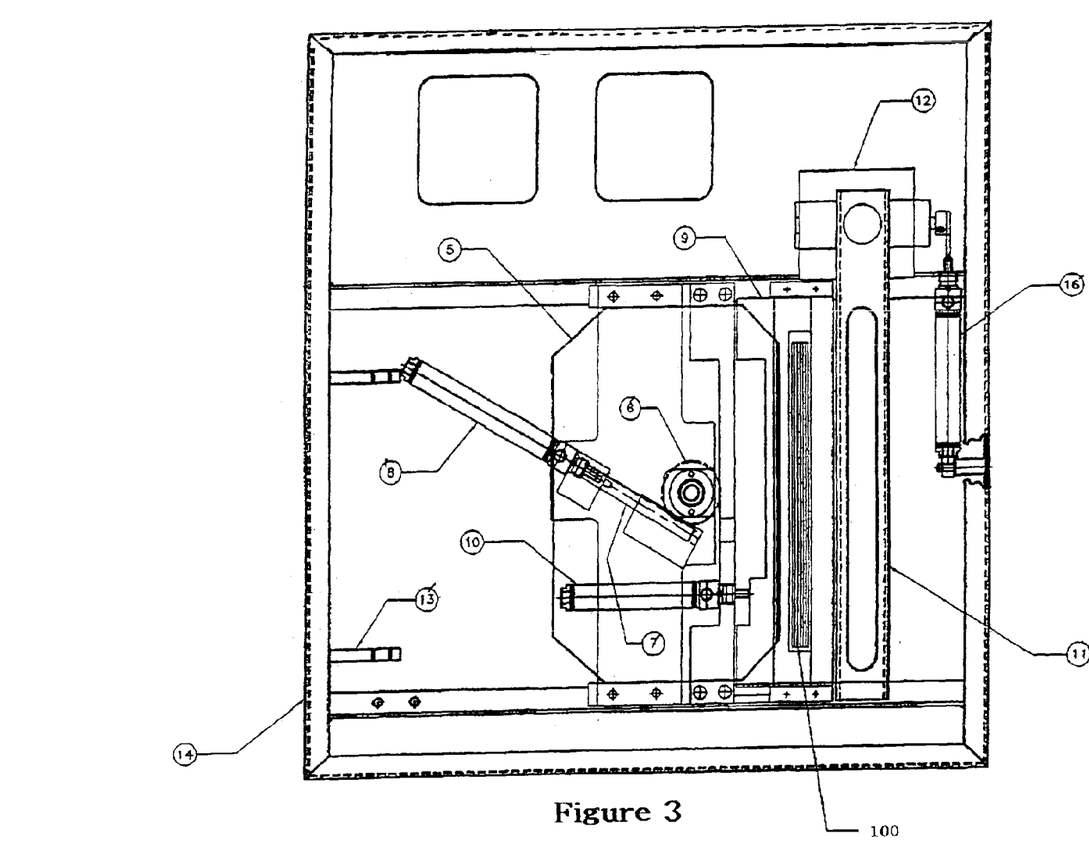
FIG. 3 is a top view of the bulk product supply module of the apparatus.

As shown in FIGS. 1–3, a hopper 2 mounted above the cooking area of the machine 14 contains bulk product 1, for example, dry, frozen, semi-hydrated and or partially cooked or pre-cooked pasta. The hopper 2 volume may be configured to hold enough bulk product 1 so that repeated fillings during a single extended period of operation are not required. When loaded with bulk product 1 the hopper 2 is aligned precisely by a pair of receptacles 13 which key it so that a bottom hopper outlet matches the top opening of a portion cavity. At the hopper outlet, the portion cavity is filled by bulk product 1 exiting the hopper 2 under force of gravity.

The volume of the portion cavity determines the portion size of the bulk product 1 processed each cycle. The portion cavity volume is set by a ram assembly 3 movable via, for example, an electrical solenoid or a pneumatic cylinder 4. The height of the ram assembly 3 is configurable, for example, via a gear and screw assembly 15 which may be manually or electrically driven.

The portion cavity is isolatable from the hopper 2 by a means for isolation, for example, a shutter or a disc 5. The disc 5 is rotatable into and out of a blocking position, which isolates the hopper 2 from the portion cavity. Rotation of the disc 5 may be controlled, for example, by a second pneumatic cylinder 8 which drives a gear rack 7 which turns a spur gear 6 that rotates the disc 5. The disc 5 is preferably able to slice through the bulk product 1, cutting it if necessary.

At the start of a cooking cycle, the disc 5 is actuated and the disc 5 rotates and isolates the portion cavity from the hopper 2 full of bulk product 1. The ram assembly 3 is then actuated to drop thereby allowing bulk product 1 in the portion cavity to exit the portion cavity 100 under gravity into an opening of a carriage 9. Because bulk product 1, for example strands of pasta, might fall at an angle and remain skewed or otherwise unevenly fill the carriage 9, carriage 9 is oversized. When filled, the carriage 9 is displaceable by, for example, by a third pneumatic cylinder 10. The carriage 9 moves horizontally to a location above a delivery tube 11. As the carriage 9 moves above the delivery tube 11, the bulk product 1 drops into the delivery tube 11 by force of gravity. When the bulk product 1 has exited, the carriage 9 retracts, moving back to a position ready for the next cycle of bulk product 1 exiting the portion cavity.

The delivery tube 11, filled with bulk product 1, is then actuated to rotate via a fourth pneumatic cylinder 16 to a 90° upward location wherein the bulk product 1 slides out of an open bottom end of the delivery tube 11 and is interrupted by a horizontal shutter, for example, a ball valve, which consolidates the bulk product prior to entry into the cooking chamber 12 upon actuation of the horizontal shutter. The shutter is actuated by a fifth pneumatic cylinder (not shown) Once filled, the cooking chamber 12 begins a cooking cycle pre-configured for the bulk product 1 in relation to the cooking characteristics of the selected bulk product 1 and the size of the bulk product 1 known from the volume setting of the portion cavity. For example, spaghetti strands may be used as the bulk product 1 configured for a portion size of between three and five ounces dry weight.

Figure 8:
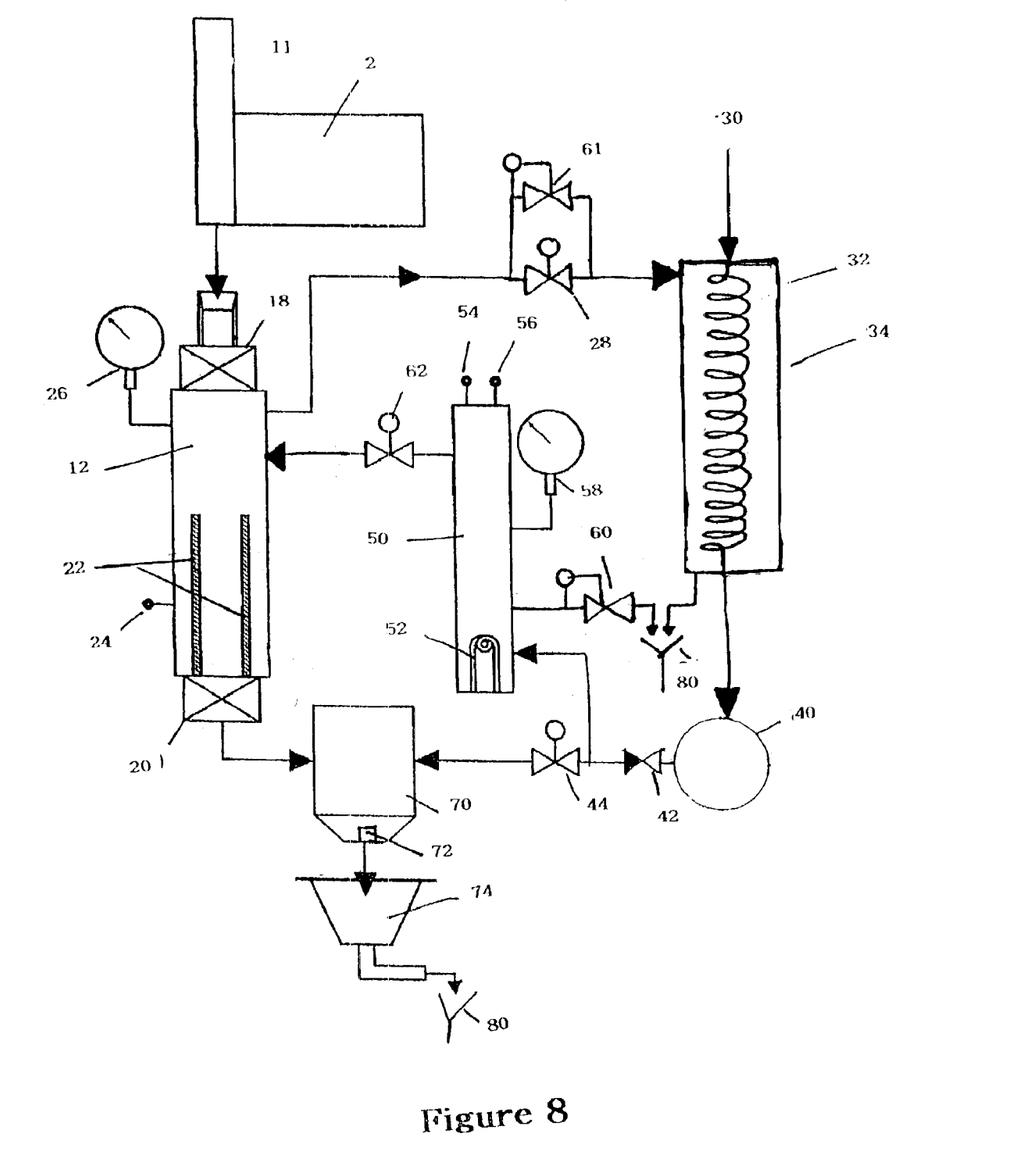
FIG. 8 is a process diagram for the apparatus.

Operation of a cooking cycle according to the process diagram shown in FIG. 8 starts with the apparatus already primed with water 30 supplied to a condenser coil 32 of the condenser 34. The water supply 30 is preferably filtered and pressure regulated. The water supply 30 traveling through the condenser coil 32 is heated by exhaust vapors exiting the cooking chamber 12 after previous cooking cycles that is collected into the condenser 34. Water exiting the condenser coil 32 is pressurized by pump 40 and directed through a check valve 42 into the boiler 50 and also upon demand via rinse valve 44 into the post cooker 70 during cooked pasta rinse sequences. The boiler 50 has a water level control via a level switch 54, for example a lumenlite type level sensor, float switches, ultrasonic switches, capacitance level indicator or other form of level indication means. The boiler 50 is heated by a boiler heater 52, for example an electric heater coil. The temperature generated in the boiler 50 is sensed by temperature probe 56. As the water is heated the pressure increases, monitored by boiler pressure probe 58 which may include a configurable pressure switch or a relative pressure output signal. As a failsafe against over pressure, the boiler 50 has a boiler pressure relief valve 60 which will safely relieve over pressure states in the boiler 50 in the event of control failure. When desired for a cooking or cleaning rinse cycle, heated/pressurized water may be delivered to the cooking chamber 12 via actuation of transfer valve 62.

The cooking chamber 12 is similarly configured with a cooking chamber heater element 22, cooking chamber temperature probe 24 and cooking chamber pressure probe 26. The cooking chamber heater element 22 maintains a preset temperature during a cooking cycle utilizing the cooker temperature probe 24 and or the cooker pressure probe 26 switch or pressure signal output. To prevent flashing of the super heated water, the transfer valve 62 may be interlocked with the inlet ball valve 18 and outlet ball valve 20 which both must be closed along with cooker relief valve 28 prior to opening of the path from the boiler 50. Manual cooker chamber pressure relief valve 61 provides a failsafe against over pressure occurring in the cooking chamber 12. When a cooking cycle has been completed, the cooker relief valve 28 is actuated to create a connection between the cooking chamber 12 and a condenser chamber 34 so that the resulting steam from super heated liquid in the cooking chamber 12 may be safely and energy efficiently cooled in the condenser 34 to atmospheric pressure and the thermal energy therein transferred to the incoming water in the condenser coil 32. With the pressure inside the cooking chamber 12 equalized, the outlet ball valve 20 may be opened whereby the contents of the cooking chamber 12 exit by force of gravity to the post cooker 70.

The heated liquid and cooked bulk product 1 may be held in the post cooker 70 for a further time interval. The cooked bulk product 1 may be rinsed with water and drained via rinse valve 44 which dilutes any starch which may have separated from the bulk product 1 during cooking. When a time interval has expired, a drain valve 72, for example a plug valve, is actuated allowing the cooked bulk product 1 and water to exit into a colander 74 wherein the water is strained away to drain 80. Also, any condensed water from the vapor in the condenser 34 is drained away to drain 80 as is any liquid moving past the pressure relief valves 60 and 61.

Bulk product 1 used with the present invention may include pasta formed of any edible grain, not limited to wheat. The pasta may be pre-cooked, semi-cooked or partially cooked. Cook time of the pasta is a function of the wall thickness, surface area, hydration and or level of pre-cooking of the pasta. Heat transfer and hydration of the pasta occurs faster in pasta formed with thinner walls and increased surface area. Examples of pasta shapes are shown on FIG. 4. The length of the pasta of any given shape may be selected for consumer preference within the bounds of the machines ability to accept the pasta lengthwise and widthwise through the hopper outlet and then throughout the apparatus as designed. As quick cook times are desirable, any limiting characteristic of the pasta with respect to quick cooking may be made up for by increasing or decreasing another characteristic as the case may be to obtain an end result acceptable cooking time.

Figure 4:
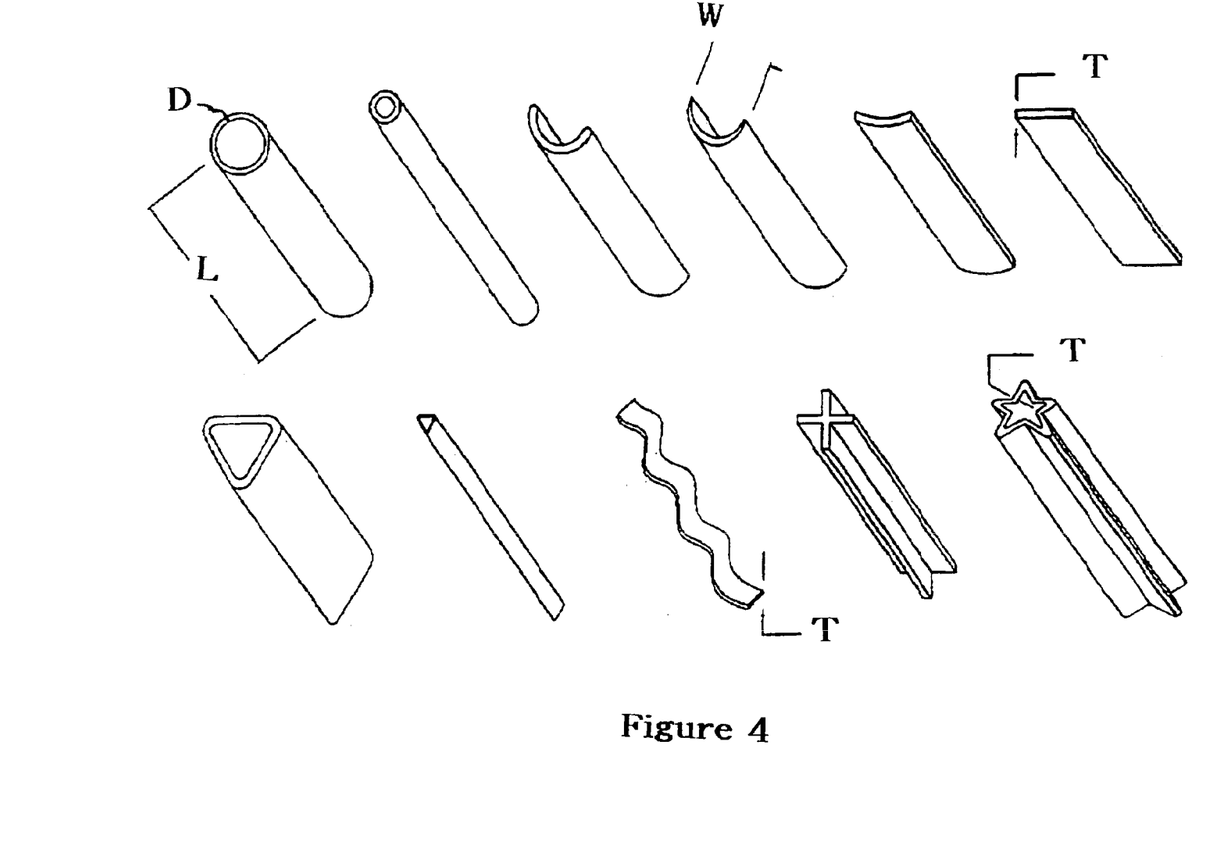
FIG. 4 is a collection of isometric views of various pasta forms for use with the apparatus.

To enable transport through the machine, the pasta should have at least limited rigidity or be of a shorter length so that pasta that might be of lesser rigidity and therefore subject to bending cannot, even if bending occurs, block the pasta flow path. The hopper 2 is configurable with baffles (not shown) or other means for use with shorter or longer lengths of pasta, the baffles preventing the pasta supply from becoming tangled by blocking off excess lateral free space in the hopper 2, according to the length of the pasta selected. Where pasta approaching cubic or spherical shapes is used, the baffles are not required because any pasta bending or tangling that occurs will not tend to cause blockage of the pasta flow path.

The present invention may be used with a wide range of specific types of pasta including pasta with characteristics that, in a preferred embodiment may include:

a wall thickness T of between 0.012 and 0.08 inches. Wider widths W requiring proportionally wider pasta flow paths through the apparatus.

a bore ranging in diameter D from 0.01 and 0.4 inches.

a length L ranging from 0.375 to 10 inches. Longer lengths L requiring proportionally longer pasta flow paths through the apparatus.

surface area and cross sectional thickness T enabling cooking within a range of 4 to less than 1 minute.

Figure 5:
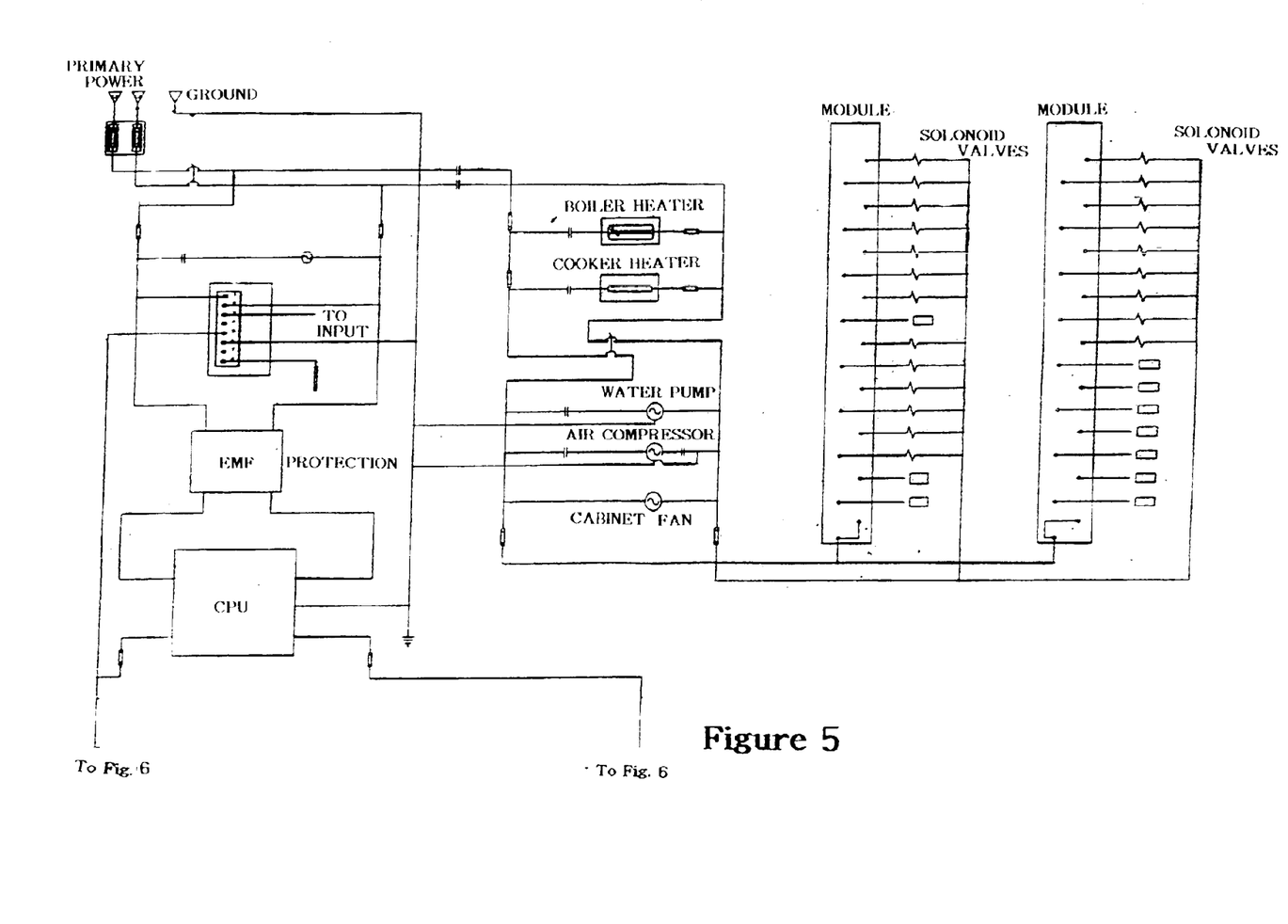
FIG. 5 is an electrical schematic of the apparatus.
Figure 6:
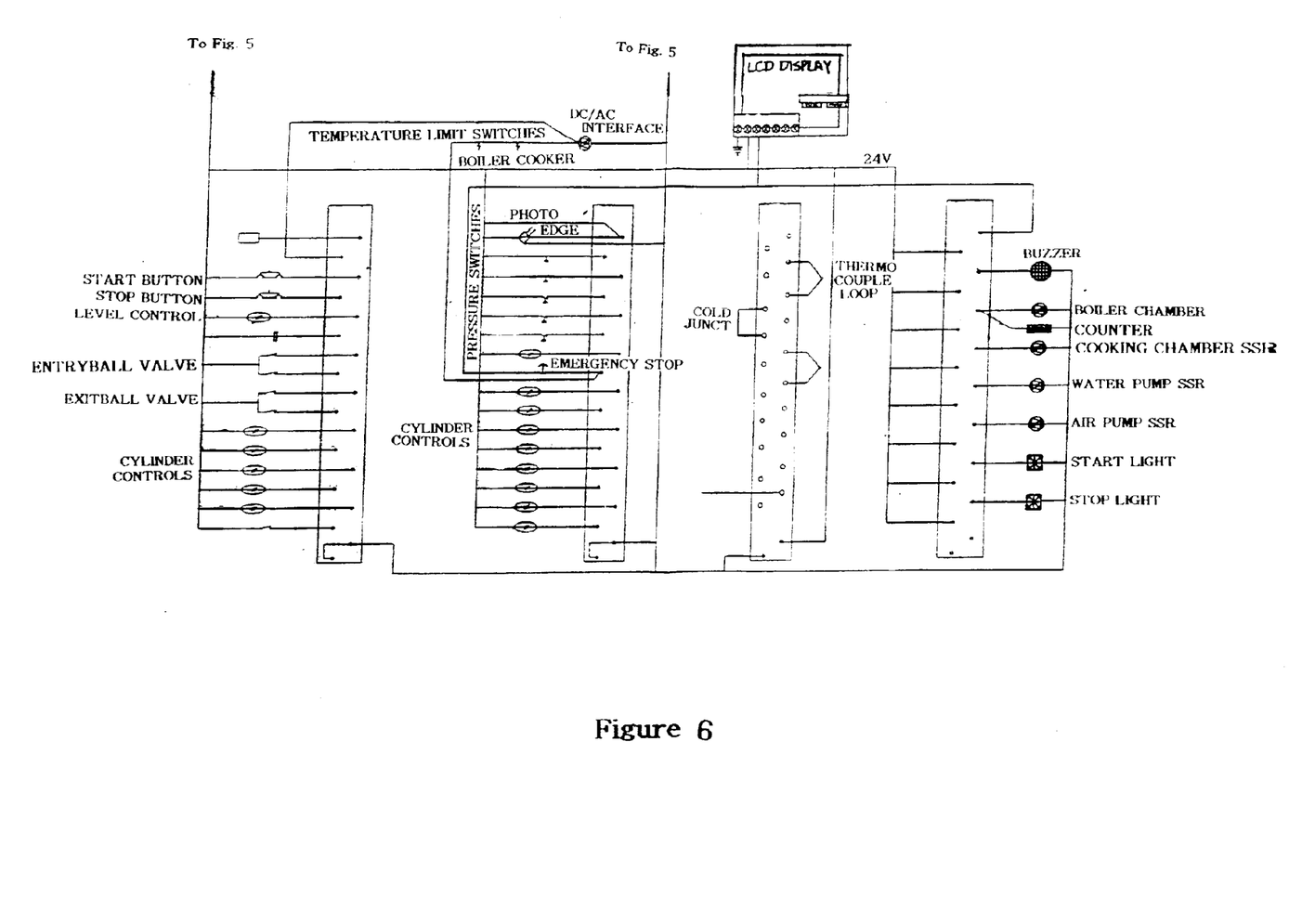
FIG. 6 is an electrical schematic of the apparatus.
Figure 7:
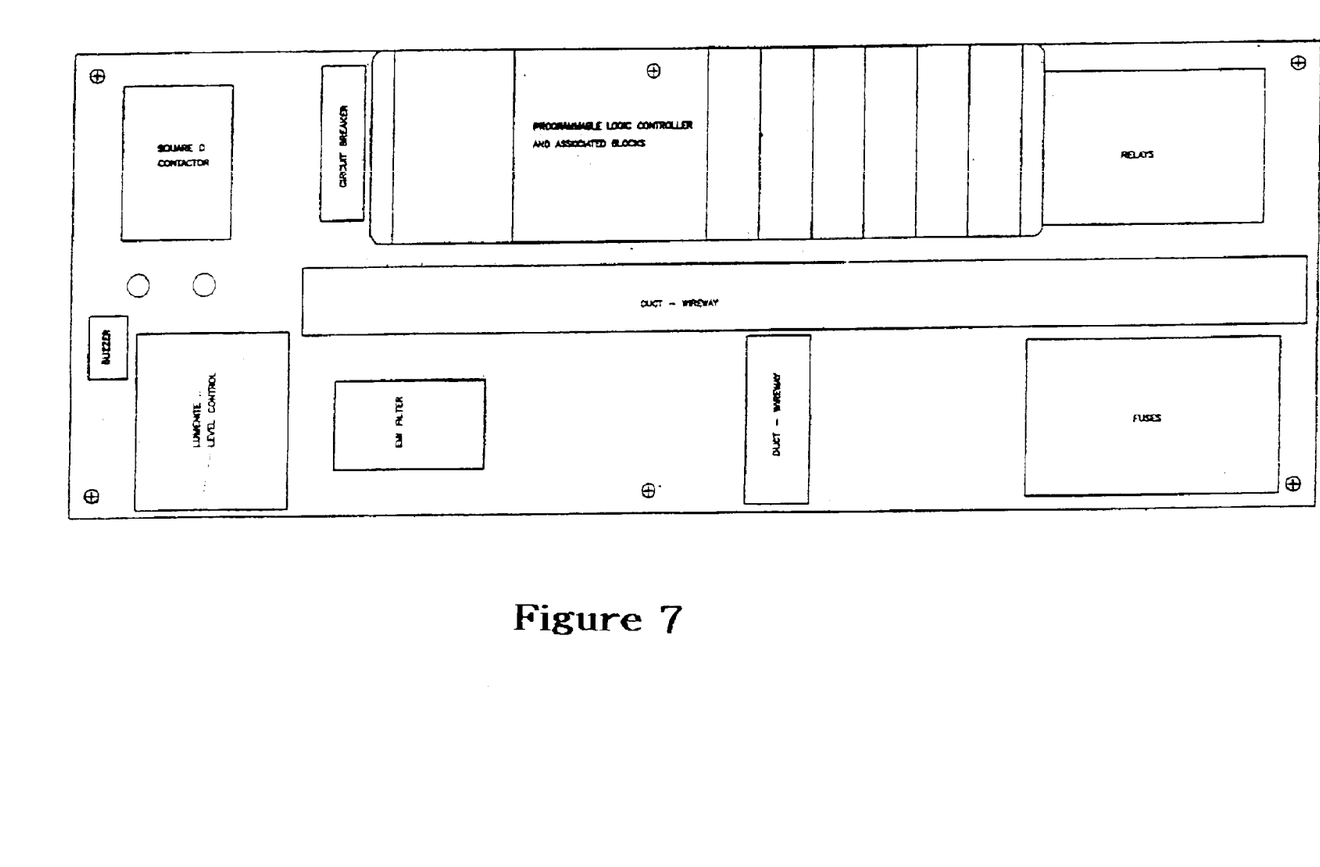
FIG. 7 is a layout schematic for an electrical panel of the apparatus.

Controls 104 and operational interlocks for the pasta machine may be hard wired or programmed via a Programmable Logic Controller (PLC). An example wiring schematic for use with a PLC controlled embodiment, showing electrical solenoids, sensors and switches is shown in FIGS. 5–7. In one embodiment, the housing has a portion size indicator 110 and a dry weight indicator 112.

Figure 9:
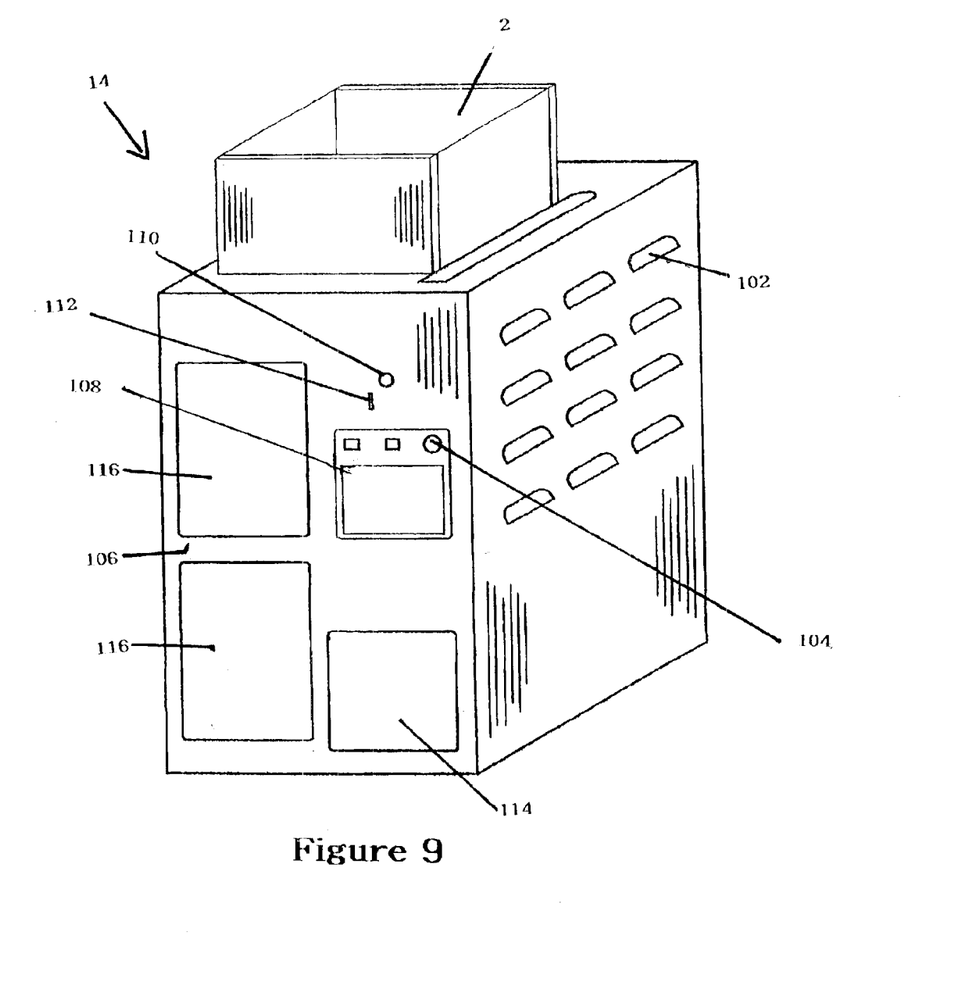
FIG. 9 is an isometric outside view of the apparatus.

FIG. 9 shows the outside of the present invention. Machine 14 has a housing 106. Located in the housing 106 are a plurality of vents 102. Controls 104 and an operator touch screen 108 are located on the housing 106.

Additionally, machine 14 has a finished product dispensing port 114. In the preferred embodiment, the housing has promotional panels 116 where logo sponsorship or other information may be displayed. For example, the machine user may wish to display nutrition or other information.

The present invention has been described in only a single demonstrative embodiment of which many others exist. The invention is entitled to a range of equivalents and is to be limited only by the scope of the following claims.

We claim:

1. A bulk product fast cooking apparatus, comprising:
   a bulk product hopper with a bulk product outlet arranged above
   a portion cavity,
   an isolation mechanism operable between the product hopper bulk product outlet and the portion cavity,
   a bulk product moving mechanism adapted for moving the bulk product from the product cavity to
   a pressurizable cooking chamber having a product inlet valve and a product outlet, the product outlet coupled to
   a post cooker having an outlet
   said cooking chamber further comprising a hot water inlet and a hot water outlet, said hot water inlet connected to a boiler and said hot water outlet connected to a condenser coil,
   wherein water travels from the condenser to the boiler, from the boiler to the cooking chamber, and from the cooking chamber to the condenser coil.

2. The bulk product fast cooking apparatus of claim 1, further comprising:
   the boiler having
   a water inlet, and
   a water outlet interconnected with the hot water inlet of the cooking chamber.

3. The bulk product fast cooking apparatus of claim 2, further comprising:
   a condenser, said condenser having the condenser coil therein, and the condenser interconnected between a water supply and the water inlet.

4. The bulk product fast cooking apparatus of claim 1, wherein said bulk product is pasta.

5. The bulk product fast cooking apparatus of claim 1, wherein the portion cavity has a variable volume.

6. The bulk product fast cooking apparatus of claim 1, wherein the portion cavity has a variable volume.

7. A pasta fast cooking apparatus for use in combination with pasta, comprising:
   a bulk product hopper with a bulk product outlet arranged above
   a portion cavity, having a variable volume,
   an isolation mechanism operable between the product hopper bulk product outlet and the portion cavity,
   a pasta moving mechanism pasta from the portion cavity to an inlet of a
   a pressurizable cooking chamber having an outlet, the outlet coupled to
   a post cooker having second outlet, the pasta configured for loading into the product hopper and portion cavity,
   said cooking chamber further comprising a hot water inlet and a hot water outlet, said hot water inlet connected to a boiler and said hot water outlet connected to a condenser coil,
   wherein water travels from the condenser to the boiler, from the boiler to the cooking chamber, and from the cooking chamber to the condenser coil.

8. The fast cook pasta apparatus of claim 7, wherein:
   the pasta has a length, along a longitudinal axis, of between 3.75 inches and 10 inches.

9. The fast cook pasta apparatus of claim 7, wherein:
   the pasta has a wall thickness of between 0.012 and 0.08 inches.

10. The fast cook pasta apparatus of claim 7, wherein:
    the pasta is tubular, with a bore diameter of between 0.01 and 0.4 inches.

11. The fast cook pasta apparatus of claim 7, wherein:
    the pasta is made from an edible grain.

12. The fast cook pasta apparatus of claim 7, wherein:
    the pasta is configured to permit cooking within a time period of between 30 seconds and four minutes.

13. The fast cook pasta apparatus of claim 7, wherein:
    the pasta is one of dry, semi-cooked and pre-cooked.

14. The fast cook pasta apparatus of claim 7, wherein:
    the pasta has one of a flat, curved, cross, and geometric cross section.

* * * * *